United States Patent [19]

Meguro et al.

[11] Patent Number: 4,581,080

[45] Date of Patent: Apr. 8, 1986

[54] MAGNETIC HEAD ALLOY MATERIAL AND METHOD OF PRODUCING THE SAME

[75] Inventors: Takashi Meguro, Yasugi; Yoshizo Sawada, Saitama; Yasunobu Ogata, Kumagaya, all of Japan

[73] Assignee: Hitachi Metals, Ltd., Tokyo, Japan

[21] Appl. No.: 620,001

[22] Filed: Jun. 12, 1984

Related U.S. Application Data

[63] Continuation of Ser. No. 354,186, Mar. 3, 1982, abandoned.

[30] Foreign Application Priority Data

Mar. 4, 1981 [JP] Japan .................................. 56-29933

[51] Int. Cl.⁴ .............................................. C04B 35/00

[52] U.S. Cl. ............................... 148/31.55; 75/123 B; 75/123 C; 75/123 H; 75/123 J; 75/123 L

[58] Field of Search .......................... 148/31.57, 31.55; 75/123 L, 123 B, 123 C, 123 H, 123 J

[56] References Cited

U.S. PATENT DOCUMENTS

| | | | |
|---|---|---|---|
| 2,088,440 | 7/1937 | Ruder | 75/123 L |
| 2,209,687 | 7/1940 | Crafts | 148/31.55 |
| 3,089,795 | 5/1963 | Hu | 148/31.55 |
| 3,096,222 | 7/1963 | Fiedler | 75/123 L |
| 3,254,990 | 6/1966 | Goering et al. | 75/123 L |
| 3,855,019 | 12/1974 | Salsgiver et al. | 75/123 L |
| 3,929,522 | 12/1975 | Salsgiver et al. | 75/123 L |
| 4,049,522 | 9/1977 | Ainslie et al. | 148/31.55 |
| 4,054,470 | 10/1977 | Malagari | 75/123 L |
| 4,065,330 | 12/1977 | Masumoto et al. | 148/31.55 |
| 4,146,391 | 3/1979 | Inoue et al. | 148/31.55 |
| 4,168,187 | 9/1979 | Takayanagi et al. | 75/123 L |
| 4,265,682 | 5/1981 | Tsuya et al. | 148/112 |
| 4,298,381 | 11/1981 | Kudo et al. | 148/31.55 |
| 4,362,581 | 12/1982 | Kimura et al. | 148/31.55 |

*Primary Examiner*—John P. Sheehan
*Attorney, Agent, or Firm*—Antonelli, Terry & Wands

[57] ABSTRACT

An alloy material for magnetic head which ensures, when formed into a head, reduced distortion during writing and reduced level of noises such as sliding noise, while presenting high wear resistance.

The alloy material is produced by preparing a molten alloy having a basic composition consisting essentially of Fe and 4 to 8 wt % of Si, and further containing one or more than two additive element or elements selected from a group consisting of elements belonging in periodic table to groups IIA, IVB, VB, VIB, VIIB, VIII, IB, IIB, IIIA, IVA and VA. The molten alloy is then quenched at a high cooling rate of at least $10^3$ °C./sec to become a thin sheet having a thickness ranging between 0.02 mm and 0.3 mm. The sheet is then heat-treated in a non-oxidizing atmosphere at 600° to 1200° C. for 0.01 to 20 hours, so that the mean grain size of 0.2 mm or smaller can be obtained.

5 Claims, 1 Drawing Figure

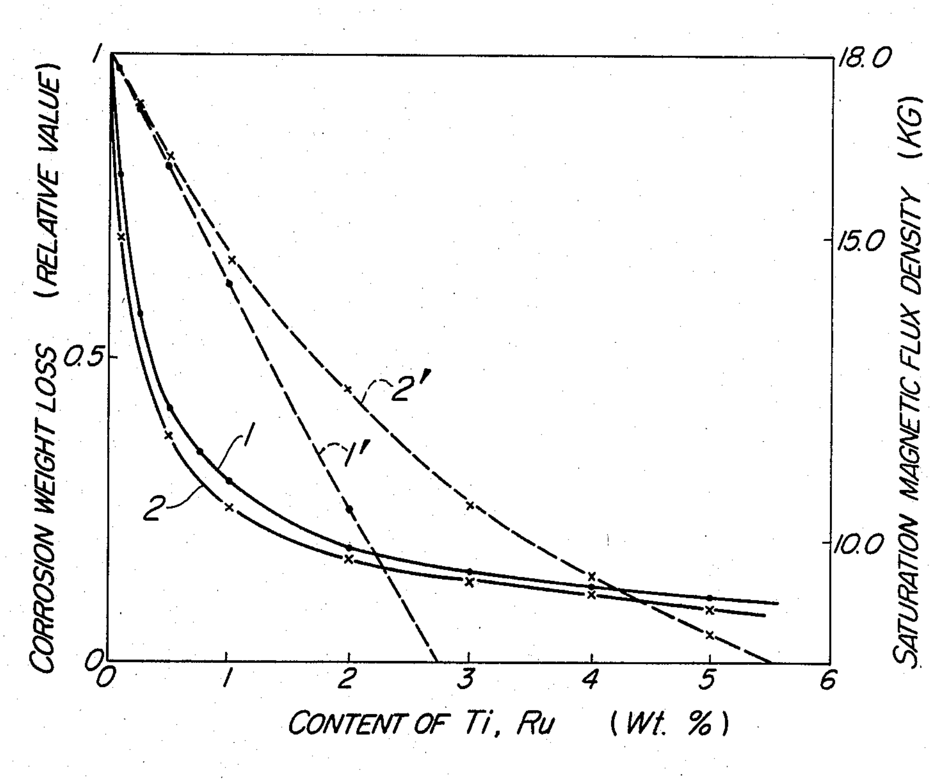
CORROSION WEIGHT LOSS (RELATIVE VALUE)
SATURATION MAGNETIC FLUX DENSITY (KG)
CONTENT OF Ti, Ru (Wt. %)
1
0.5
0
18.0
15.0
10.0
0
1
2
3
4
5
6
1
2
1'
2'

MAGNETIC HEAD ALLOY MATERIAL AND METHOD OF PRODUCING THE SAME

This is a continuation of application Ser. No. 354,186, filed Mar. 3, 1982, abandoned.

BACKGROUND OF THE INVENTION

The present invention relates to a magnetic head alloy material which, when formed into a magnetic head, can diminish the distortion of the head during writing, as well as noises such as sliding noise, while presenting a high resistance to wear. The invention is also concerned with a method of producing the same.

The current magnetic recording technic requires an increase in the coercive force of the magnetic recording medium in order to enhance the recording density of tape. In fact, the coercive force of magnetic recording medium, which was about 300 Oe at the beginning of use of this technic has been increased to well reach about 1200 Oe.

For obtaining good writing property, the magnetic material for the magnetic head is required to have a large saturation magnetization value Bs. Permalloy has been broadly used as a material which has a high saturation magnetization value. The current development in this field, however, requires a material having extremely high saturation magnetization value Bs of the order of 9000 G which is much higher than that of the permalloy. Hitherto, sendust has been known as a magnetic head material having a higher saturation magnetization value than the permalloy.

The sendust itself exhibits superior magnetic property in pure state. However, when this material is formed into a magnetic head, the saturation magnetization value is inevitably decreased down to the order of 8,000 to 10,000 G, because of addition of various elements for improving corrosion resistance and workability. Thus, the development in the property of the tape itself has not been accompanied by the development in the technic for writing to the tape, so that it has not been possible to make full use of the advantages of the developed tape. The alloy of sendust system, in addition, usually has an impractically low ductility and, hence, could hardly be processed mechanically. From this point of view, the alloy of sendust system is still unsatisfactory as industrial material.

Under these circumstances, there is an increasing demand for a novel material suitable for use as the material of high density magnetic recording, in the field of technic concerned.

SUMMARY OF THE INVENTION

Accordingly, an object of the invention is to provide a magnetic head material having a high saturation magnetization value Bs and small magnetostriction constant $\lambda s$, i.e. exhibiting small magnetic distortion during writing, and reduced level of noises such as sliding noise, while presenting high mechanical workability and corrosion resistance.

The present inventors have made various studies and have found that the above-described object of the invention can be achieved by a material produced by adding some additives to a melt of iron-silicon system alloy, cooling the melt by so-called rapid quenching process and subjecting the alloy thus obtained to a specific heat treatment to adjust the grain size to a level below 0.2 mm.

The above and other objects, features and advantages of the invention will become clear from the following description of the preferred embodiments taken in conjunction with the accompanying drawing.

BRIEF DESCRIPTION OF THE DRAWING

The attached sole FIGURE is a graph showing the corrosion weight loss and saturation magnetic flux density of Fe-6.5Si-Ti system and Fe-6.5Si-Ru system alloys in accordance with the invention.

DESCRIPTION OF THE PREFERRED EMBODIMENT

In general, the soft magnetic property of iron-silicon system alloy is improved to decrease the loss as the silicon content is increased. It is well known that the best magnetic property is obtained when the silicon content is about 6.5 wt% at which the magnetostriction becomes zero. On the other hand, however, when the silicon content exceeds 4 wt% the alloy becomes drastically brittle thereby making it difficult to be rolled. Therefore, as a matter of practice, alloy having silicon content ranging between 3 to 3.5 wt% has been broadly used as the material of magnetic core and magnetic sheild, to obtain the material which is easily rolled at the cost of magnetic property to some extent.

In contrast to the above, according to the invention, by means of refining the grain size to below 0.2 mm it is possible to maintain a good mechanical workability in spite of the fact that the alloy has a high silicon content of 4 to 8 wt%.

The material of the invention can be produced by rapidly quenching a melt of alloy having a predetermined composition at a high cooling rate of at least $10^{3\circ}$ C./sec in accordance with so-called rapid quenching process. The cooling rate less than $10^{3\circ}$ C./sec makes the grain size unacceptably large to promote the tendency of embrittlement inherent to the iron-silicon system alloy, thereby seriously deteriorating the workability. The rapid quenching of a high cooling rate in excess of $10^{3\circ}$ C./sec can be achieved, for example, by the following procedure.

Predetermined metallic materials are put at a predetermined compositional ratio into a vessel made of a refractory material such as quartz or alumina, and are heated and melted by a known measure such as high frequency induction heating. The molten metal thus obtained is then jetted through a nozzle, under application of pressure by, for example, argon gas, into the nip between the peripheral surfaces of a pair of cooling metallic rolls which are rotated at a peripheral speed of between 15 and 40 m/sec, preferably 20 to 30 m/sec. As a result of contact with the metallic roll surfaces, the molten metal is quenched and formed into a thin sheet. The thickness of the sheet is controlled to fall between 0.02 and 0.3 mm by the control of various factors such as rate of jetting of the molten metal, rotation speed of the rolls and so forth.

Because of the quenching at an extremely high cooling rate, there is a residual strain in this sheet, so that it is not always stable in thermal point of view. Therefore, this sheet is then subjected to a heat treatment which is conducted in a non-oxidizing atmosphere at a temperature between 600° and 1200° C. for 0.01 to 20 hours. In consequence, the residual strain is removed and the grains are refined to have grain size smaller than 0.2 mm which is quite favourable from the view point of magnetic property.

In the material of the invention, it is necessary to refine the grain size thereof such that it becomes 0.2 mm or smaller, by suitably controlling the cooling rate and the heat treatment condition. This is because the magnetic permeability at high frequency is decreased to increase the loss when the grain size is greater than the above-specified value. Such a material imposing a high loss is quite inadequate as the material for magnetic head.

As stated before, the alloy in accordance with the invention should have a basic composition consisting essentially of 92 to 96 wt% of Fe and 8 to 4 wt% of Si, and although the soft magnetic property and the magnetostriction property are generally determined by the Si content it is said that the alloy having above composition cannot provide sufficient corrosion resistance, high frequency property and wear resistance required for the material of magnetic head. The corrosion resistance of Fe-Si alloy after having been rapidly quenched is not so excellent as compared with the bulk state Fe-Si alloy and, hence, imposes a certain problem.

In order to obviate the above-described problems, the alloy in accordance with the invention contains, as the additive element(s), one or more than two element or elements selected from a group consisting of elements belonging in periodic table to groups IIA, IVB, VB, VIB, VIIB, VIII, IB, IIB, IIIA, IVA and VA, namely, Mg, Ti, V, Nb, Ta, Cr, W, Ru, Rh, Pd, Cu, Au, Cd, Ga, In, Ge, Sn, Pb, N, P, As, Sb and Bi, by an amount of 0.01 to 2 wt% in total. These additive elements, falling within the above-mentioned range, provide high corrosion resistance, high-frequency property and wear resistance, while maintaining high saturation magnetic flux density, all of which are quite important requisites for the material of magnetic head.

FIGURE shows the relationship between the corrosion weight loss (relative value) and saturation magnetic flux density as observed through a salt water spray test conducted with materials obtained by adding Ti and Ru, respectively, to the Fe-6.5Si alloy, as examples of the material in accordance with the invention. In this FIGURE, curves 1 and 1' show the Ti content (X) dependencies of the corrosion weight loss and the saturation magnetic flux density in Fe-6.5Si-(X)Ti system alloy, while curves 2 and 2' show the Ru content(Y) dependencies of those in Fe-6.5Si-(Y)Ru system alloy.

As will be understood also from this graph, the contribution to the prevention of corrosion weight loss made by the Ti and Ru is remarkable, even if the Ti and Ru contents are small. For instance, it is possible to obtain a substantially doubled corrosion resistance by addition of only 0.25 wt% of these additives. On the other hand, the addition of such additives causes a large reduction in the saturation magnetic flux density. In fact, the saturation magnetic flux density comes down below 10 KG unfavourably, if the additive content is increased beyond 2 wt%.

The selection of kinds of the additive elements appreciably affects the saturation magnetic flux density and corrosion resistance, particularly on the saturation magnetic flux density, when the amounts of such additives are increased. The reduction in the saturation magnetic flux density, however, is not so serious and does not come down below 10 KG or so, provided that the sum of amounts of one or more than two element(s) selected from the aforesaid group does not exceed 2 wt%.

The material in accordance with the invention has a high electric resistance and, thanks to a small thickness, a superior high frequency property, in addition to the aforesaid advantages such as high saturation magnetization, small magnetostriction and superior wear resistance. The material of the invention, therefore, can suitably be used as a material for magnetic head to be used in computers, video recording, card reader, audio device and so forth.

The advantages of the invention will be fully realized from the following description of an example.

EXAMPLE

Silicon (99.999%), electrolytic iron (99.9%) and various additive elements as shown in Table 1 in the form of pure metals or suitable alloys were placed in a heat-resistant vessel, and were melted together by a high frequency induction heating.

TABLE 1

| | Kind of material | Coercive force Hc (Oe) | Saturation magnetic flux density Bs(KG) | Magneto-striction ($\times 10^{-6}$) | Vickers hardness (HV) | Amount of wear (relative value) |
|---|---|---|---|---|---|---|
| Alloys of invention | Fe—6.5Si—1Be | 0.110 | 14.5 | 1 | 450 | 7 |
| | Fe—6.5Si—1V | 0.135 | 12.9 | 1.5 | 510 | 6 |
| | Fe—6.5Si—0.5Nb | 0.107 | 16.1 | 1 | 480 | 7 |
| | Fe—6.5Si—1Nb | 0.120 | 14.3 | 1.5 | 520 | 7 |
| | Fe—6.5Si—0.9Ta | 0.138 | 13.9 | 1 | 440 | 8 |
| | Fe—6.5Si—0.1Cr | 0.121 | 17.0 | 1 | 400 | 9 |
| | Fe—6.6Si—0.6Cr | 0.130 | 13.6 | 1 | 430 | 8 |
| | Fe—6.8Si—1Cr | 0.150 | 12.1 | 2 | 470 | 8 |
| | Fe—6.6Si—0.6Mn | 0.148 | 16.0 | 3 | 390 | 8 |
| | Fe—6.4Si—0.6Ru | 0.138 | 15.8 | 1 | 380 | 8 |
| | Fe—6.4Si—0.3Pd | 0.150 | 15.3 | 1 | 380 | 8 |
| | Fe—6.5Si—0.6Cu | 0.170 | 13.0 | 1 | 370 | 8 |
| | Fe—6.5Si—0.6Zn | 0.181 | 12.8 | 1 | 360 | 9 |
| | Fe—6.6Si—0.6B | 0.122 | 16.8 | 1 | 390 | 8 |
| | Fe—6.6Si—0.1Al | 0.111 | 17.4 | 1 | 410 | 8 |
| | Fe—6.5Si—0.4C | 0.137 | 16.1 | 1 | 550 | 6 |
| | Fe—6.5Si—0.8Ru—0.4B | 0.120 | 15.3 | 1 | 420 | 8 |
| | Fe—6.2Si—0.9Ru—0.5C | 0.140 | 14.4 | 1 | 530 | 6 |
| | Fe—6.4Si—0.9Zr—0.1N | 0.155 | 13.3 | 1 | 490 | 6 |
| | Fe—6.5Si—0.3Cr—1.2Mn | 0.160 | 11.5 | 3 | 460 | 8 |
| | Fe—6.5Si—0.3Cr—1.0P | 0.146 | 11.2 | 1 | 480 | 7 |
| | Fe—6.5Si—0.3Cr—0.4Bi | 0.134 | 12.7 | 1 | 440 | 8 |
| | Fe—6.6Si—0.7Cu—0.9B | 0.179 | 12.6 | 1 | 430 | 8 |
| | Fe—6.5Si—0.7Cu—0.2Mo | 0.188 | 12.5 | 1 | 450 | 7 |
| Ferrite | | 0.030 | 4.2 | 14 | 680 | 1 |

TABLE 1-continued

| Kind of material | Coercive force Hc (Oe) | Saturation magnetic flux density Bs(KG) | Magneto-striction ($\times 10^{-6}$) | Vickers hardness (HV) | Amount of wear (relative value) |
|---|---|---|---|---|---|
| High hardness permalloy | 0.019 | 6.5 | 2 | 230 | 20 |
| Sendust | 0.025 | 8.5 | 2 | 410 | 7 |

The molten alloy thus obtained was then supplied into the nip between a pair of steel rolls (100 mm dia.) rotating at a peripheral speed of 25 m/sec so as to be quenched at a cooling rate of $4.5\times10^{3°}$ C./sec. As a result, the molten alloy was formed into a ribbonlike thin sheet having a thickness of 50 μm and a width of 5 mm. Observing the sheet with a microscope, it was measured that the mean grain size thereof was 0.01 mm.

The sheet thus formed was then heat-treated in vacuum at 900° C. for 3 hours, so that the mean grain size became 0.03 mm.

The heat-treated material was then coiled in a toroidal form to constitute an iron core and the magnetic property of such an iron core was measured. The result of the measurement is shown also in Table 1, together with the magnetic property measured with commercially available ferrite, high hardness permalloy and sendust.

Then, magnetic heads for audio cassettes were formed with these materials. With these magnetic heads, sine curve waves at a frequency of 1 KHz were recorded to an alloy magnetic tape having a coercive force (Hc) of 1100 Oe to check the recording distortion. As a result, it was confirmed that, while the magnetic heads produced from the materials of the invention can make the recordng perfectly within the destortion range of 3%, some of the magnetic heads made from sendust failed to make the recording and all other materials completely failed to make the recording.

From this fact, it is clearly understood that the material of the invention is superior to the conventional materials for magnetic heads.

What is claimed is:

1. A magnetic head alloy material having a basic composition consisting of Fe, 4 to 8 wt % of Si, and one or more than two additive element or elements by an amount of 0.25 to 2 wt % in total, said additive element or elements being selected from the group consisting of Ti and Ru, and said alloy material having a mean grain size of 0.2 mm or smaller.

2. A magnetic head alloy material having a basic composition consisting of Fe, 4 to 8 wt % of Si, and one or more than two additive element or elements by an amount of 0.25 to 2 wt % in total, said additive element or elements being selected from the group consisting of Be, V, Nb, Ta and Cr, and said alloy material having a mean grain size of 0.2 mm or smaller.

3. A magnetic head alloy material having a basic composition consisting of Fe, 4 to 8 wt % of Si, and an additive by an amount of 0.25 to 2 wt % in total, said additive being selected from the group consisting of Zr-N, Cu-B and Cu-Mo, and said alloy material having a mean grain size of 0.2 mm of smaller.

4. A magnetic head alloy material having a basic composition consisting of Fe, 4 to 8 wt % of Si, and a combination of one or more than two additive element or elements to be selected from the group consisting of Ti and Ru, and one or more than two additive element or elements to be selected from the group consisting of Be, V, Nb, Ta and Cr by an amount of 0.25 to 2 wt % in total, and said alloy material having a mean grain size of 0.2 mm or smaller.

5. A magnetic alloy material according to claim 4, wherein said alloy material is a sheet material prepared from a molten mixture of said basic composition which has been cooled at a cooling rate of $10^{3°}$ C./sec or higher to form said sheet with a thickness ranging between 0.02 and 0.3 mm, said sheet having been heat-treated in a non-oxidizing atmosphere at 600° to 1200° C. for 0.01 to 20 hours.

* * * * *